(No Model.)

J. W. MALOY.
STONE DRESSING MACHINE.

No. 300,277. Patented June 10, 1884.

Fig. 1.

WITNESSES.

INVENTOR (No Model.) 9 Sheets—Sheet 5.

J. W. MALOY.
STONE DRESSING MACHINE.

No. 300,277. Patented June 10, 1884.

WITNESSES
A. L. White
A. Seover

INVENTOR
J. W. Maloy
by Wright Brown
Attys (No Model.) 9 Sheets—Sheet 6.

J. W. MALOY.
STONE DRESSING MACHINE.

No. 300,277. Patented June 10, 1884.

WITNESSES
A. L. White
A. Secrist

INVENTOR
J. W. Maloy
by Wright & Bowie
Attys.

(No Model.) 9 Sheets—Sheet 7.

J. W. MALOY.
STONE DRESSING MACHINE.

No. 300,277. Patented June 10, 1884.

WITNESSES

INVENTOR (No Model.)  9 Sheets—Sheet 8.

J. W. MALOY.
STONE DRESSING MACHINE.

No. 300,277. Patented June 10, 1884.

WITNESSES

INVENTOR (No Model.) 9 Sheets—Sheet 9.

J. W. MALOY.
STONE DRESSING MACHINE.

No. 300,277. Patented June 10, 1884.

WITNESSES

INVENTOR

UNITED STATES PATENT OFFICE.

JAMES W. MALOY, OF SOMERVILLE, MASSACHUSETTS.

STONE-DRESSING MACHINE.

SPECIFICATION forming part of Letters Patent No. 300,277, dated June 10, 1884.

Application filed January 5, 1884. (No model.)

*To all whom it may concern:*

Be it known that I, JAMES W. MALOY, of Somerville, in the county of Middlesex and State of Massachusetts, have invented certain Improvements in Stone-Dressing Machines, of which the following is a specification.

This invention has for its object to provide an improved machine adapted to rapidly and effectively dress stone surfaces of various forms, and to form circular orifices, molded external edges, shallow surface depressions surrounded by raised surfaces, and other configurations on marble or other kinds of stone.

My invention consists in the improved mechanism hereinafter described and claimed.

Of the accompanying drawings, forming a part of this specification,
Fig. 2 represents a longitudinal vertical central section. Fig. $2^a$ represents a top view and a section on line $x$ $x$, Fig. 2.
Fig. 3 represents a section on line $y$ $y$, Fig. 2, looking toward the right.
Figs. 4 and 5 represent details.
Fig. 6 represents a section on line $z$ $z$, Fig. 2, looking toward the left.
Fig. 7 represents a section on line $y$ $y$, Fig. 2, looking toward the left. Figs. $2^b$ and 8 to 33, inclusive, represent detail views.

The same letters of reference indicate the same parts in all the figures.

Figure 1:
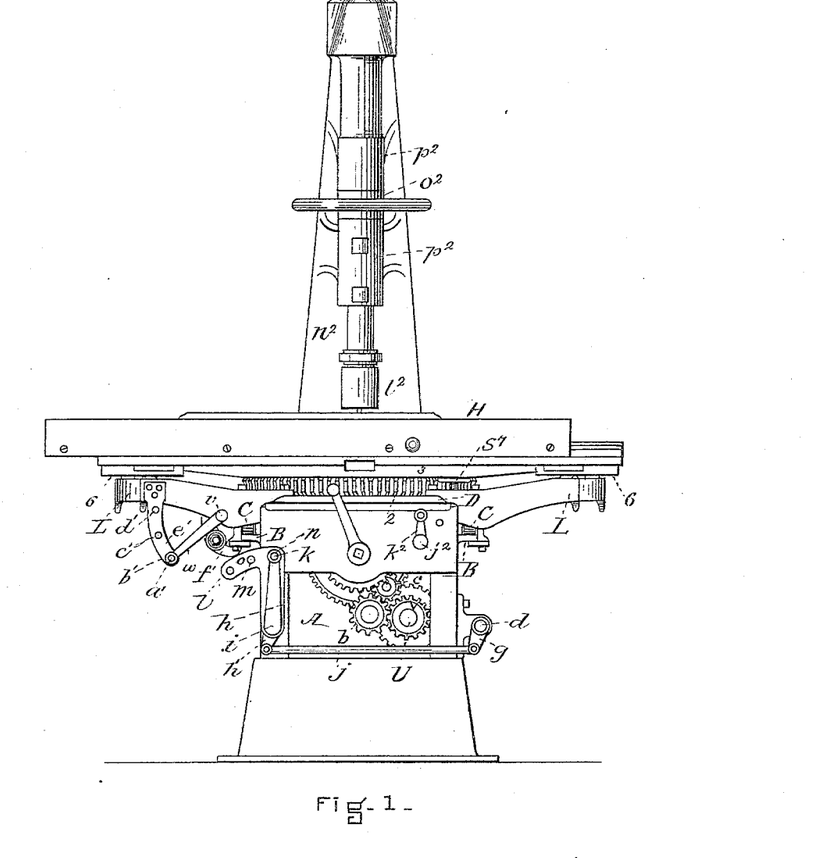
Figure 1 represents a front elevation of my improved machine.
Figures 2, 3, 4, 5:
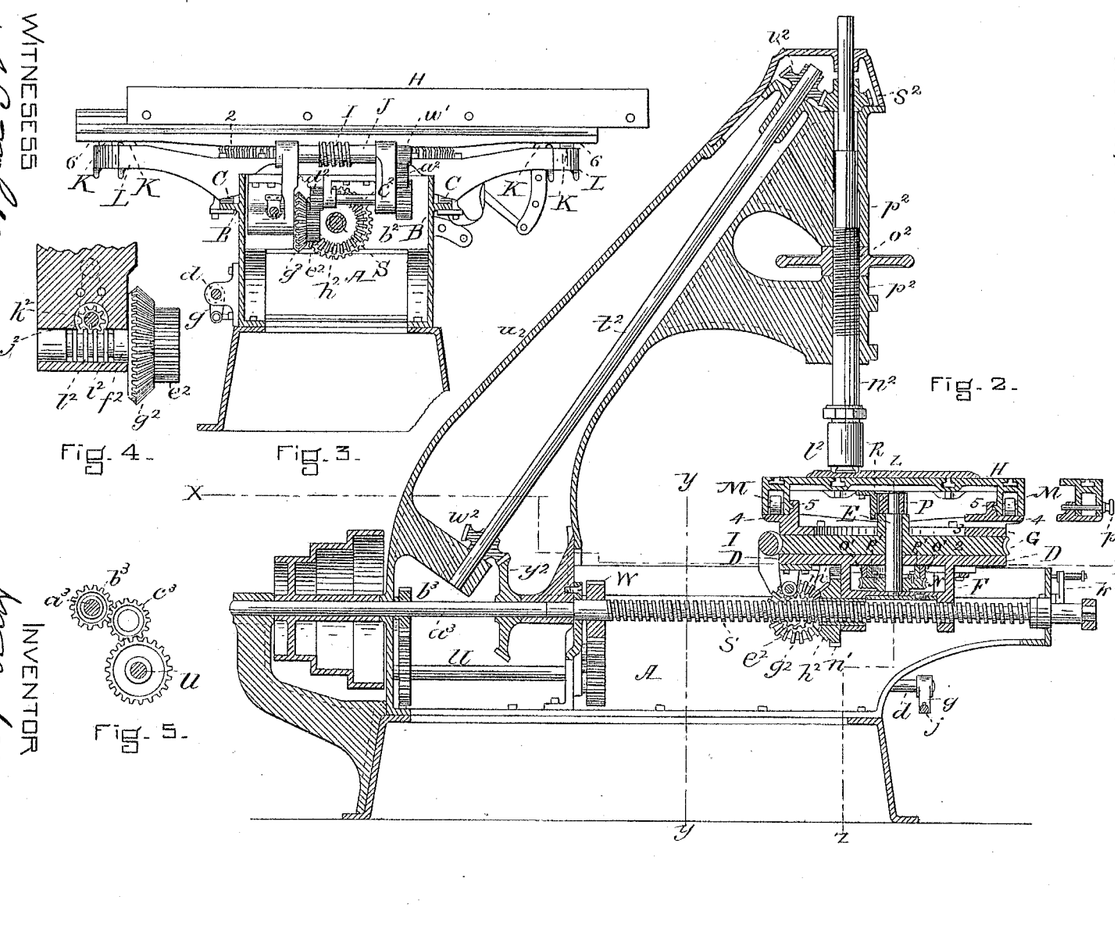

In the drawings, A represents the fixed supporting-frame or base of the machine, which is provided with horizontal longitudinal tracks or flanges B B, (see Figs. 1, $2^a$, and 6,) which support rollers C C, journaled in bearings in a primary supporting-carriage, D, said carriage being adapted by the rollers and tracks to move back and forth longitudinally of the frame A.
In the primary carriage D is journaled a vertical arbor, E, the lower end of which is supported by a step or offset, F, attached to said primary carriage. (See Fig. 2.) The arbor E serves as a pivot for a rotary support, G, on which the secondary or work supporting carriage H rests. Said support is composed of a gear-wheel, 2, (whose teeth mesh with a worm, 1, on the shaft J, hereinafter described,) and a casting, 3, rigidly attached to the wheel 2, and having two tracks, 4 4, two guides, 5 5, for the secondary carriage, and flat bearing-surfaces 6 6, resting on rollers K K, journaled in lateral extensions L L of the carriage D, said rollers supporting the rotary support and secondary carriage, and enabling them to rotate easily. The wheel 2 is adapted to be rotated by the worm 1, independently of the primary carriage D and of the arbor E. The secondary carriage has rollers M M, resting on the tracks 4 4 of the rotary support, whereby the secondary carriage is adapted to reciprocate horizontally on said support in a direction governed by the position of the support, which may be adjusted so as to cause its tracks 4 4 to stand at right angles with the tracks B B of the fixed base A, or at any other desired angle.

Figures 2A, 2B:
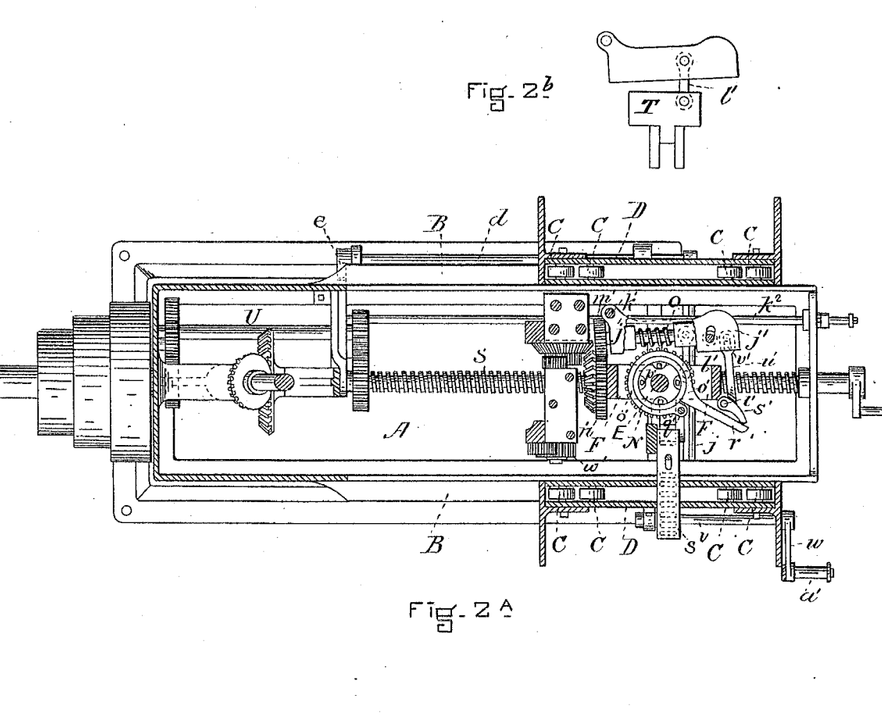
Figures 6, 7, 10, 11, 12, 13, 14:
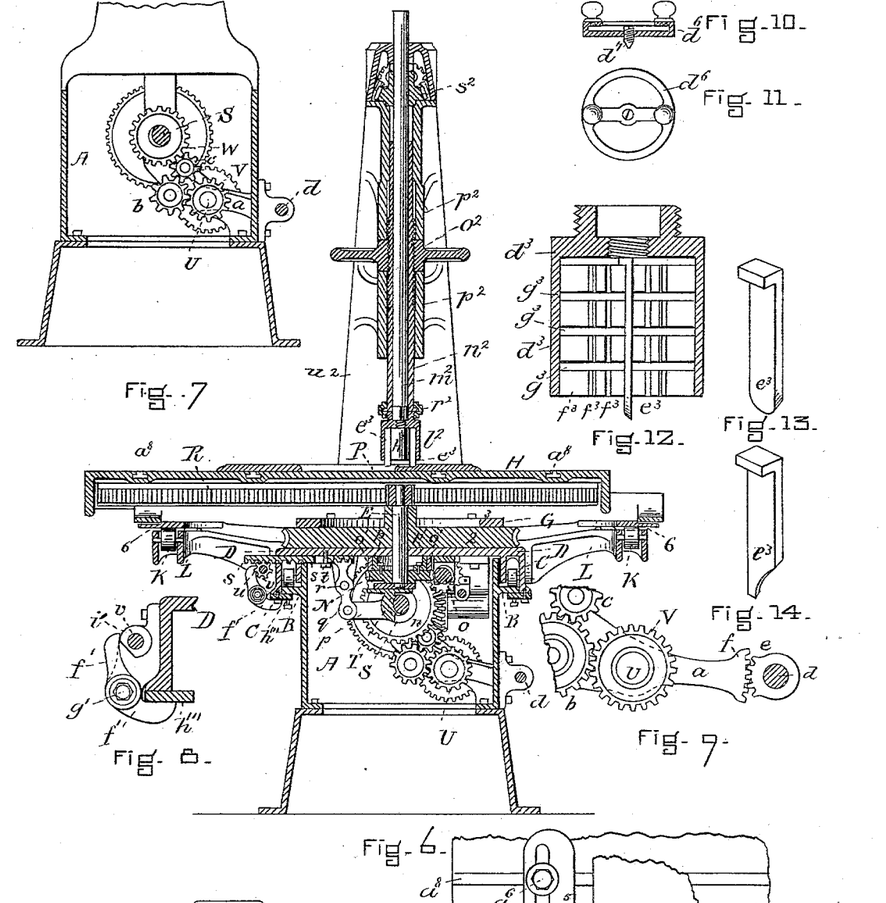
Figure 9:
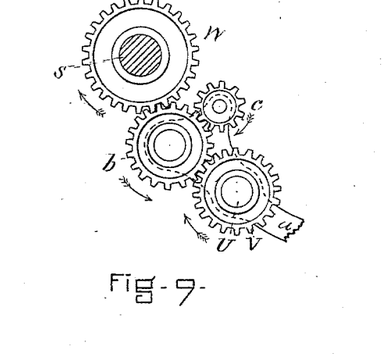
Figure 9B:
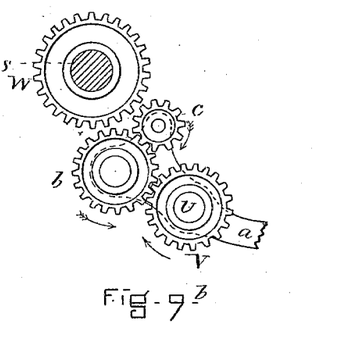
Figure 9C:
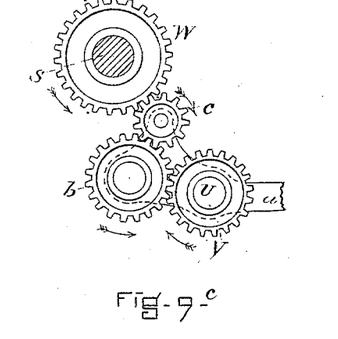
Figure 12A:
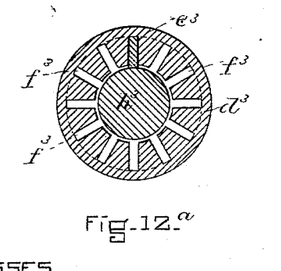

To the lower end of the arbor E is attached a worm-gear wheel, N, adapted to engage with a movable worm, O, (see Figs. $2^a$ and 6,) and to the upper end of said arbor is attached a pinion, P, meshing with a rack, R, affixed to the under side of the secondary carriage H.

Means are provided, as hereinafter described, for moving the primary carriage in either direction on the tracks B B and for rotating the arbor E in either direction, and thereby, through the pinion P and rack R, moving the secondary carriage in either direction on the tracks 4 4 of the rotary support. Means are also provided for rotating the support G and the secondary carriage in either direction. The secondary carriage is therefore capable of moving with the primary carriage in a rectilinear direction longitudinally of the frame or base A, or independently of the primary carriage at any desired angle with said frame or base, and is also capable of rotating. A great variety of movements can thus be given to the work which is secured to the upper surface of the secondary carriage, said carriage being provided with inverted-T-shaped slots, like those in the bed of a metal-planer, to receive adjustable clamping bolts or devices.

The means employed for moving the primary carriage are a screw-shaft, S, journaled in bearings in the frame A, a half-nut, T, supported by the primary carriage and adapted to slide thereon toward and from the shaft S, so as to engage the primary carriage with or disconnect it from said shaft, and reversing mechanism whereby the shaft S may be rotated in either direction, so as to move the primary carriage in either direction. Said reversing mechanism is composed of a shaft, U, driven by a suitable motor and having a gear-wheel, V, a gear-wheel, W, affixed to the screw-shaft, a yoke or lever, $a$, journaled on the shaft U, and carrying two intermediate gear-wheels, $b$ $c$, which are so arranged that they can be alternately engaged with the wheel W of the screw-shaft by tilting the yoke $a$, and a rock-shaft, $d$, journaled in bearings on the side of the base A, and having a toothed segment, $e$, engaging with a toothed segment, $f$, on the end of the yoke $a$. (See Fig. 9.) The rock-shaft $d$ is adapted to hold the yoke $a$ either in the position shown in Figs. 6, 7, and 9, so as to connect the wheel W of the screw-shaft with the wheel V of the driving-shaft through both of the intermediate wheels, $c$ $b$, or to hold the yoke in the position shown in Fig. $9^a$, so as to connect the screw-shaft with its motor through the intermediate wheel $b$ only, the other intermediate wheel, $c$, being idle. The rotation of the screw-shaft can therefore be reversed by a movement of the rock-shaft, which is effected by means of a crank, $g$, on the rock-shaft $d$, a lever, $h$, pivoted at $i$ to the frame A, and a rod, $j$, connecting the crank $g$ to the shorter arm $h'$ of the lever $h$. The longer arm of the lever $h$ is provided with a handle, $k$, which the operator grasps for the purpose of operating the rock-shaft, said handle being adapted to act as a spring bolt or detent, engaging with holes $l$ $m$ $n$ in a plate, $o$, affixed to the frame A, (see Fig. 1,) the end holes, $l$ $n$, respectively holding the lever $h$ by its handle in the positions shown in Figs. 9 and $9^a$. When the handle is in the middle hole, the yoke $a$ is held in the position shown in Fig. $9^b$, neither of the intermediate gears, $b$ $c$, being engaged with the wheel W of the screw-shaft. It is obvious, however, that the rock-shaft may be operated by other means—for example, by the crank $g$ alone, said crank being provided with a suitable handle adapted to be grasped by the operator.

The half-nut T, that engages the primary carriage D with the screw-shaft, is provided with an arm, $p$, to the outer end of which is pivoted a lever, $q$, which is pivoted at $r$ to a bracket on the primary carriage, and is formed at its upper end as a rack-segment, adapted to engage with teeth in a rack bar or plate, $s$, which is adapted to slide on the under side of the primary carriage, and is held in contact therewith by a headed bolt, $t$, passing through a slot in the plate $s$. The outer portion of the plate $s$ is formed as a rack, the teeth of which mesh with a pinion, $u$, on a shaft, $v$, which is journaled in the primary carriage D. It will be seen that by rotating the shaft $v$ in one direction or the other the half-nut T will be moved toward or from the screw-shaft by the pinion $u$, rack-plate $s$, and lever $q$, thus engaging the primary carriage with or disconnecting it from the screw-shaft. The shaft $u$ is turned by an operating-crank, $w$, which is provided with a spring handle or bolt, $a'$, adapted to engage with either one of a series of holes, $b'$ $c'$ $d'$, formed in a plate, $e'$, attached to the primary carriage D, said holes and bolt securing the shaft in different positions, and preventing accidental movement of the nut. The operator is thus enabled to cause the primary carriage to move along the tracks B or to remain at rest, without stopping the screw-shaft, and when the primary carriage is engaged with the screw-shaft the direction of its movement may be reversed at any moment by reversing the rotation of said shaft.

To prevent accidental movement of the primary carriage D on its tracks when the half-nut T is disengaged from the screw-shaft, I provide a clamp, $f'$, consisting of a short two-armed lever pivoted at $g'$ to the primary carriage. (See Figs. 6 and 8.) One arm of this clamp bears against a flange, $h'''$, on the primary carriage D, projecting under one of the tracks or flanges B of the frame A. The other arm of the clamp bears against a cam, $i'$, Fig. 8, on the shaft $v$, said cam being so formed that when the shaft $v$ is in position to hold the half-nut T away from the screw-shaft the cam will press against the clamp, so as to press it against the flange $h'''$, and thus cause the latter to bind against the track or flange B with such force that the primary carriage cannot be easily moved on its tracks. When the shaft $v$ is in position to engage the half-nut with the screw-shaft, the cam $i'$ releases the clamp $f'$, so that it does not press against the flange $h'''$. The arbor E, having the pinion P, that engages the rack R of the secondary carriage, is rotated to move said carriage on the tracks 4 4 by means of the laterally-movable worm O, (see Figs. $2^a$ and 6,) which is journaled in a frame, $j'$, said frame being pivoted at $k'$ to the primary carriage and connected by a link, $l'$, with the half-nut T. (See Figs. $2^a$ and $2^b$.) This connection causes the worm O to be moved toward and from the worm-wheel N on the arbor E by the same mechanism that moves the half-nut T, the arrangement being such that the worm is brought into engagement with the wheel N when the half-nut is removed from the screw-shaft, and vice versa. When the handle $a'$ is engaged with the hole $d'$ of the plate $e'$, the half-nut T is withdrawn from the screw-shaft, the clamp $f'$ is pressed against the flange, and the worm O is engaged with the wheel N, the nut T and clamp $f'$ being thus held so that the primary carriage is immovable, and the worm O being held in position to operate the secondary carriage. When the handle $w$ is engaged with the hole $b'$, the nut T is held in contact with the screw-shaft, the worm O is held away from the wheel, and the clamp $f'$ is prevented from binding against the flange $h'''$ of the primary carriage. When the handle $a'$ is in the middle hole, $c'$, the half-nut T is held away from the screw-shaft and the worm O is held away from the wheel N, both carriages being disconnected and free to be moved on their tracks. The arbor on which the worm O is formed has a gear-wheel, $m'$, meshing with a gear-wheel, $n'$, affixed to the screw-shaft S. The worm is rotated by this connection with the screw-shaft, and, when engaged with the worm-wheel N, rotates the latter with the arbor E, causing the pinion P of said arbor to act on the rack R of the secondary carriage and move said carriage on the tracks 4 4 in a direction corresponding to the direction of rotation of the screw-shaft. The arbor E is locked and prevented from rotating, when the half-nut T is engaged with the screw-shaft, by a brake, $o'$, (see Figs. 2 and 2ª,) inclosing a flange, $p'$, rigidly attached to the worm-wheel N, and a device operated by the frame $j'$, when said frame is moved to separate the worm O from the wheel N, whereby the brake is caused to lock the wheel N and arbor E, so that the secondary carriage cannot be moved by the pinion P of said arbor. The brake $o'$ is a divided band of metal, pivoted at $q'$ to the bottom of the primary carriage, and having an outwardly-projecting arm, $r'$.

$s'$ represents a dog or lever pivoted at $t'$ to the primary carriage, and adapted to bear against the arm $r'$ at its outer end or nose. The dog $s'$ is provided with an arm, $u'$, which is rigidly attached to the dog, and is provided in its outer end with a slot, $v'$, which receives a stud on the frame $j'$, in which the worm O is journaled. Said slot is somewhat inclined or diagonal to the movement of the stud when the frame $j'$ is moving away from the screw-shaft; hence said movement causes the arm $u'$ and dog $s'$ to turn slightly on the pivot $q'$, and thus press the nose of the dog $s'$ against the arm $r'$ of the brake. The brake is thus caused to lock the arbor E tightly, so that it cannot rotate. When the frame $j'$ is moved to engage the worm O with the wheel N, the brake is caused to release the arbor E. It must be borne in mind that the arbor E is locked by the described devices only when the frame $j'$ is moved to its farthest extent away from the screw-shaft and the half-nut T is engaged with the screw-shaft. When the frame $j'$ and half-nut are in their intermediate positions, leaving the carriages disconnected but not locked, the brake $o'$ is in a loose condition.

The worm 1, engaging with the worm-wheel 2 of the rotary support G, has a pinion, $w'$, at one end of its arbor, (see Fig. 3,) said pinion being connected by an intermediate pinion, $a^2$, with a gear-wheel, $b^2$, on one end of an arbor, $c^2$, which is journaled in bearings or hangers attached to the primary carriage. The other end of the arbor $c^2$ has a pinion, $d^2$, which meshes with a gear-wheel, $e^2$, affixed to a longitudinally-movable arbor, $f^2$, which is journaled in a hanger secured to the primary carriage. The arbor $f^2$ also has affixed to it a bevel gear-wheel, $g^2$, which is adapted, when the arbor is moved toward the screw-shaft, to engage with a bevel gear-wheel, $h^2$, on said shaft. The bevel gear-wheel $h^2$ is engaged with the screw-shaft by a key or feather adapted to slide in a longitudinal groove in said shaft, so that the wheel moves along the screw-shaft with the primary carriage when the latter is engaged with the screw-shaft. When the bevel-gears $g^2$ $h^2$ are engaged with each other, motion is communicated from the screw-shaft through the arbors $f^2$ and $c^2$ and intermediate pinion, $a^2$, to the worm 1, causing the latter to rotate the support G in a direction corresponding to the direction of rotation of the screw-shaft. The longitudinally-movable arbor $f^2$ is provided with peripheral rack-teeth $i^2$, with which engages a pinion, $j^2$, on a shaft, $k^2$, journaled in a hanger attached to the primary carriage, (see Fig. 4,) said shaft having a crank, $k^6$, at the front end of the carriage, by which the operator can turn the shaft, and thus cause the pinion $j^2$ to move the arbor $f^2$ lengthwise, to engage its bevel-gear $g^2$ with or disconnect it from the bevel-gear $h^2$ of the screw-shaft. The rack-teeth extend entirely around the arbor $f^2$; hence they are always in engagement with the pinion $j^2$.

It will be observed that the described mechanism enables any desired movement or series of movements to be imparted to the secondary carriage, and adapts the machine particularly for dressing upper surfaces of stone slabs and producing such diversities of surface as are found in tops of wash-stands or lavatories, having a portion of the upper surface depressed to form a raised margin, and also having a circular orifice in the center, to permit access to a fixed wash-bowl set under the slab.

The machine is provided with an overhanging cutter, $l^2$, of any suitable form, secured to a rotary arbor, $m^2$, which is journaled in a sleeve, $n^2$, having its external surface threaded and engaged with a nut, $o^2$, which is interposed between two parts of a fixed tubular holder, $p^2$, and supported by the lower part of said holder. The arbor is connected to the sleeve $n^2$ in such manner that it can rotate freely and will move longitudinally with the sleeve when the latter is raised or lowered by rotating the nut $o^2$. Said connection is effected, in the present instance, by means of a ring, $r^2$, which embraces an external flange on the lower end of the sleeve $n^2$, and is free to rotate thereon, the cutter being rigidly attached to said ring. The cutter is also secured rigidly to the arbor, so as to rotate therewith. It will be seen that by rotating the nut $o^2$ the arbor $m^2$ and its cutter can be raised and lowered to any desired extent. The arbor $m^2$ is provided with a bevel gear-wheel, $s^2$, which is engaged with the arbor by means of a feather in the wheel and a groove in the arbor, so that the arbor can move endwise independently.

$t^2$ represents an arbor extending diagonally upward through a hollow arm, $u^2$, affixed to the frame A, said arm supporting the tubular holder $p^2$. The arbor $t^2$ has two bevel-gears, $v^2$ $w^2$, meshing, respectively, with the bevel-gear $s^2$ on the cutter-arbor $m^2$, and with a bevel-gear, $y^2$, on the main driving-shaft $a^3$, which is journaled in bearings in the frame A, and is in line with the screw-shaft S, but rotates independently thereof. The shaft $a^3$ has a gear-wheel, $b^3$, which gives motion, through an intermediate wheel, $c^3$, Figs. 2 and 5, to the shaft U, whereby the screw-shaft S is rotated.

The form and construction of the cutter employed will depend on the nature of the work. I prefer to construct the cutter on the general plan shown in Figs. 6, 12, 12ᵃ, 13, 14, 19, and 20, a holder, $d^3$, being employed, and one or more cutting-bits, $e^3$, detachably secured to said holder and having their lower ends formed to cut the stone.

The holder $d^3$ (shown in Figs. 12 and 12ᵃ) is a hollow cylindrical shell having at its upper end an externally-threaded neck adapted to be screwed into the ring $r^2$, above described, and provided in its inner surface with a series of vertical slots, $f^3$, which are radial in cross-section, as shown in Fig. 12ᵃ, and with a series of annular or transverse slots, $g^3$, intersecting the slots $f^3$. The bits $e^3$ are bent at right angles at their upper ends, as shown in Figs. 13 and 14. The body of each bit enters one of the longitudinal slots $f^3$, and the bent end enters one of the annular slots $g^3$, (see Fig. 12,) each bit being supported by the bearing of its bent end on the bottom of the annular slot in which it rests. A cylindrical plug, $h^3$, is inserted in the holder and fills the central space, thus holding the bits in the slots $f^3$. Said plug has a threaded neck, which is screwed through a threaded socket in the holder $d^3$ and into a similar socket in the lower end of the cutter-arbor $m^2$, thus securing the cutter to the arbor. It will be seen that as many bits may be used as there are slots $f^3$; but in practice two will be sufficient. As the bits become worn, they can be adjusted by moving their bent ends from one annular slot $g^3$ to the one below, so that long bits can be provided and used until worn to a small fraction of their original length. When the cutter is intended for forming flat surfaces on a slab, the cutting-edges of the bit should have the form shown in Figs. 6 and 13. When used for molding the edge of a slab or the margin of an orifice in the slab, the bits will be formed to produce the desired shape.

Figures 17, 19, 20:
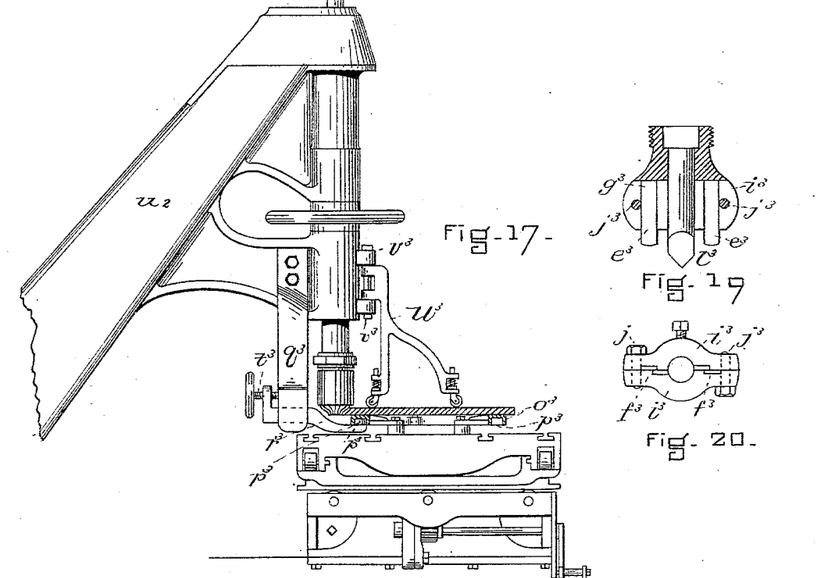
Figure 18:
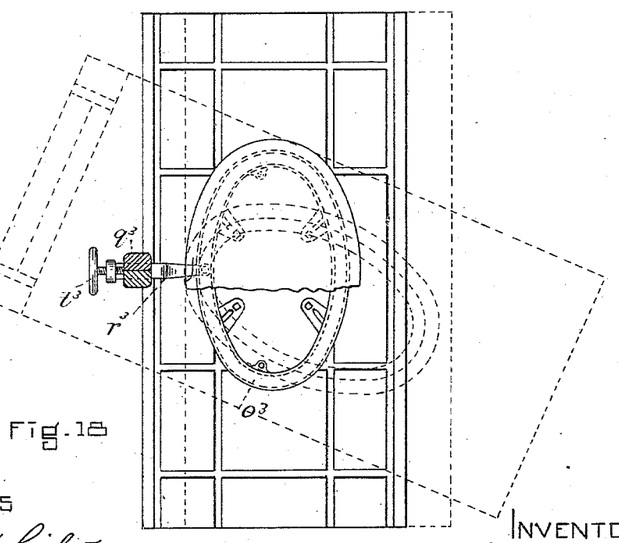
Figure 21:
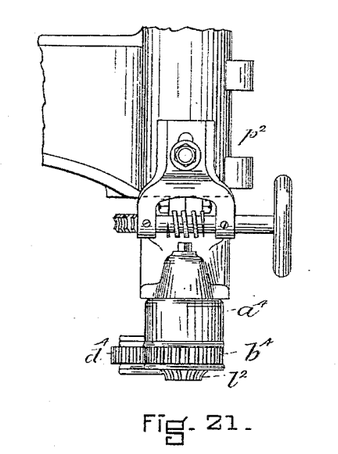
Figure 22:
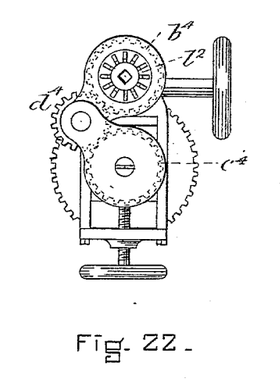
Figure 23:
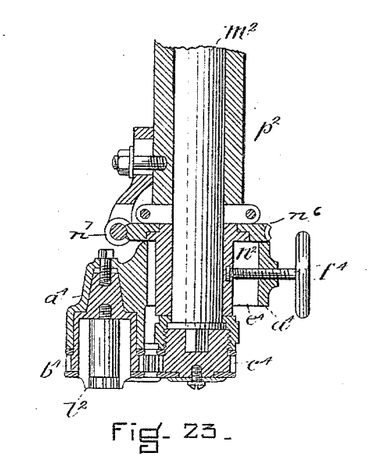
Figure 24:
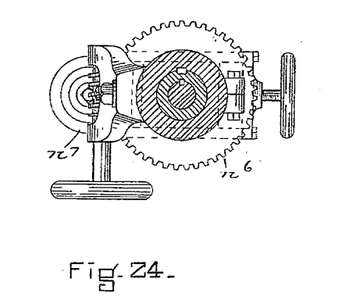
Figure 33:
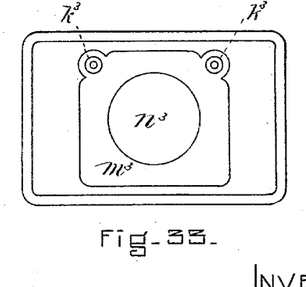

Figs. 19 and 20 show a tool-holder composed of two parts, $i^3$ $i^3$, clamped together by bolts $j^3$ $j^3$. The proximate surfaces of said parts are flat, and are provided with vertical slots $f^3$, receiving the shanks of the bits, and with transverse slots $g^3$, receiving the bent ends of the bits, the latter being adapted to be moved from one slot $g^3$ to another, as in the form above described. The two bits thus arranged are adapted to cut in a stone slab an annular groove, $k^3$, Fig. 33, such as is ordinarily formed around the portion of the slab through which a water-pipe passes to supply water through a cock to the bowl.

The holder is provided with a central socket adapted to receive a drill, 13, which will form an orifice for the water-pipe exactly in the center of the circular space surrounded by the groove $k^3$, so that the groove is necessarily concentric with the orifice, and the pipe-fixture, when inserted, will be concentric with the groove.

From the foregoing description it will be obvious that the machine is adapted to perform several kinds of work, and can be quickly and easily changed from one kind to another.

In forming the recessed or sunken surface $m^3$ in the slab, the secondary carriage is alternately moved with the primary carriage and independently thereof, so as to cause the stone to move in a rectangular path under the cutter, the length of each movement being governed by the operator until the entire portion to be reduced has been presented to the cutter. The rotary support may be adjusted so that the alternate movements of the secondary carriage with the primary carriage and independently thereof will be in a rhomboidal instead of a rectangular path. When the top surface of a slab is being dressed, the slab lies directly on the secondary carriage, and is secured by means of four clamps, formed as shown in Figs. 15 and 16. The base of each clamp is composed of a slotted plate, $a^5$, adapted to bear on the secondary carriage, and having two bolts, $a^6$ $a^6$, passing through the slot $a^7$, and having heads which fit the T-shaped slots $a^8$ of the carriage. To the plate $a^5$ is pivoted a jaw, $c^5$, adapted to fit the corner of a slab of stone, and a clamp, $d^5$, adapted to bear on the upper surface of the stone. A screw, $e^5$, presses the clamp $d^5$ upon the stone. It will be seen that a stone may be securely held by four of these clamps, and that their construction is such that they can be adjusted in the slots $a^8$ to any size of slab.

In forming the circular orifice $n^3$, the slab is raised above the top surface of the secondary carriage, and the cutter is provided with bits formed substantially as shown in Fig. 14. The initial orifice having been formed in the slab by sawing or otherwise, the secondary carriage is adjusted until the cutter has entered the margin of the sawed orifice to the required depth. The primary and secondary carriages are then locked, so that they cannot move endwise, special locking devices being employed for each carriage independent of the locking devices before described, the special locking device for the secondary carriage being a pin, $p^6$, (see Fig. 2,) passed through the edge of the carriage into the guide 5, while the special locking device for the primary carriage is a screw, $s^7$, (see Fig. 1,) passing through the primary carriage and bearing on the base A. The secondary carriage is then rotated by the support G, the cutter being thus caused to form a molded circular margin around the orifice, the size of said orifice being increased to any desired extent by the adjustment of the secondary carriage. The initial orifice is usually sawed in the slab to a given size.

To facilitate the proper placing of the stone on the secondary carriage, I provide a disk, $d^6$, (Figs. 10 and 11,) having at its center a stud, $d^1$, adapted to enter an orifice formed in the center of the secondary carriage. The diameter of the disk is such that it will enter and fit somewhat closely the sawed orifice in the slab, and thus form a guide in placing the slab, the disk being first placed on the carriage, and removed after the slab has been adjusted to it.

The edges of a slab may be molded, as shown in Fig. 17, and any desired form of slab may be molded at its edge by employing a guide or pattern, $o^3$, which is secured to the secondary carriage and is provided with a groove, $p^3$, of the form to be imparted to the edge of the slab. The arm $u^2$ of the frame is provided with a bracket, $q^3$, to which is secured an arm, $r^3$, projecting under and entering the groove of the pattern $o^3$. The support G is rotated, and the primary and secondary carriages are detached from their motors and left free to move loosely on their respective carriages. The edge of the slab is thus presented to the cutter in such manner that the cutter will form a molded edge on the slab parallel with the groove. The slab is first adjusted edgewise relatively to the cutter by the arm $r^3$, which is adapted to slide endwise in the bracket $q^3$, and is held in any position it may assume by a screw, $t^3$, which also adjusts it. The slab is held from moving laterally by upwardly-projecting pins or dowels on the pattern $o^3$, and is prevented from being displaced vertically by a holding-down device composed of a swinging bracket, $u^3$, journaled in ears $v^3$ on the arm $u^2$, and provided with anti-friction rollers, which are pressed downwardly on the slab by springs. This device permits the free lateral movement of the slab, but prevents it from being lifted from the holding-pins.

The cutter may be offset from the spindle $m^2$, and rotated by an intermediate planet-gear connecting it with the spindle, as shown in Figs. 21 to 24, inclusive, so that it can operate in forming the margin of an orifice near the end of a slab when the slab is of such length that it cannot rotate under the arm $u^2$. To this end the cutter is journaled in a holder, $a^4$, which is adapted to revolve around the spindle $m^2$, and has a gear-wheel, $b^4$, which is connected with a gear-wheel, $c^4$, on the spindle by a planet-gear, $d^4$, which is supported by the holder $a^4$. The holder $a^4$ is rendered adjustable, so as to vary the distance between the cutter $l^2$ and the spindle $m^2$, by means of a slot, $e^4$, in the holder, through which the sleeve of the spindle passes, and a screw, $f^4$, journaled in said sleeve and passing through the holder $a^4$. (See Fig. 23.) The holder $a^4$ is provided with a worm-wheel, $w^6$, which engages with a worm, $w^7$, journaled in a bracket on the holder $p^2$. The operator rotates said worm by means of a hand-wheel thereon, and thus causes the holder $a^4$ to rotate on the spindle $m^2$, giving the cutter a planetary motion, which enables it to mold the margin of an orifice in a non-rotating slab.

Figures 25, 26, 27, 28:
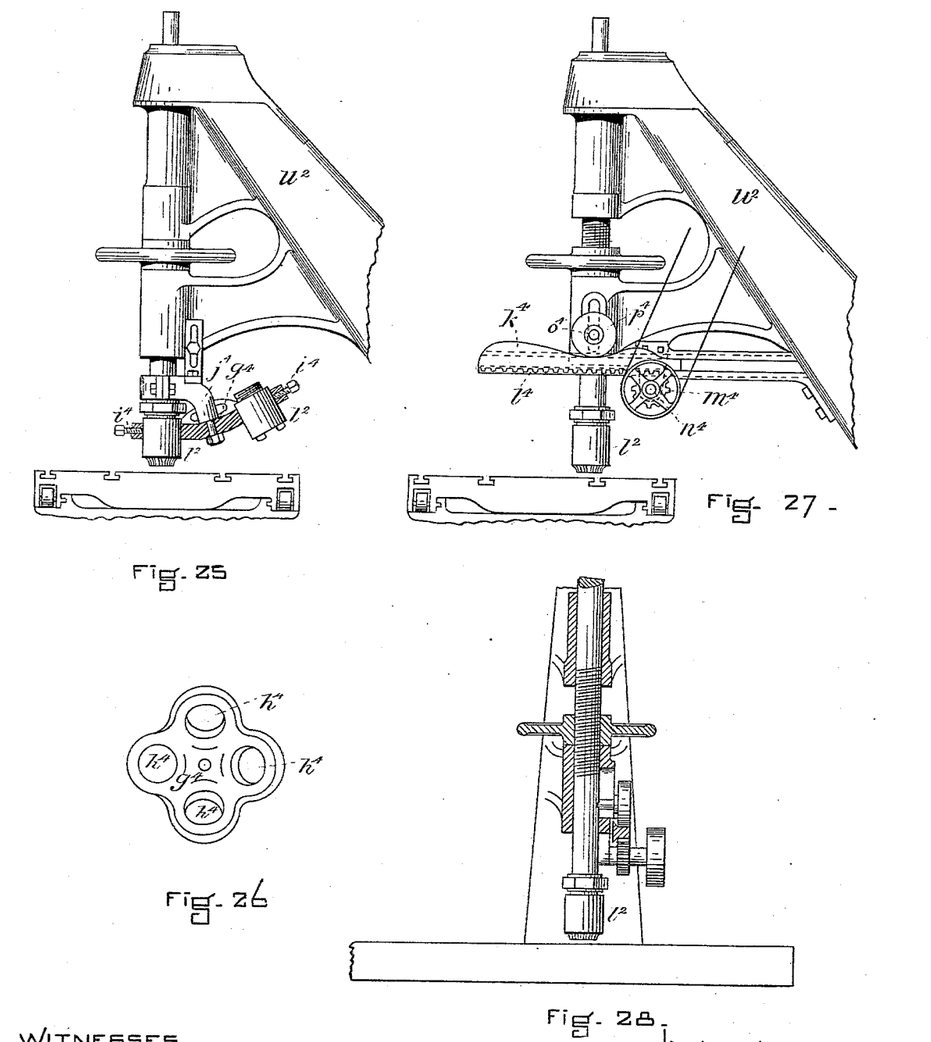

Figs. 25 and 26 show a rotary turret, $g^4$, having a number of sockets, $h^4$, adapted to receive different cutters, each socket having a set-screw, $i^4$, which hold the cutters not in operative position. The turret is of dish shape and is journaled on an arm, $j^4$, attached to the sleeve of the spindle $m^2$. By rotating the turret either of its cutters may be brought in position to be screwed into the spindle, the set-screw holding the cutter thus brought in position being loosened before the cutter is engaged with the spindle. The described form of the turret enables it to hold the cutter not in use in inclined positions above the surface on which the operating-cutter acts.

Figs. 27 and 28 show means for automatically varying the height of the cutter while it is operating, and thus enabling it to dress undulating surfaces. A slide, $k^4$, having an undulating upper edge is fitted to slide in guides on the arm $u^2$, and is provided with a rack, $l^4$, with which engages a pinion, $m^4$, on a rotating shaft, $n^4$. The sleeve $n^2$ of the spindle is adapted to rise and fall, and has a stud, $o^4$, in which is a roller, $p^4$, bearing on the undulating surface of the slide $k^4$. The slide is reciprocated by the rack and pinion, and its curved edge causes the cutter to rise and fall, and thus impart a corresponding curvature to a surface on the carriage.

Figure 29:
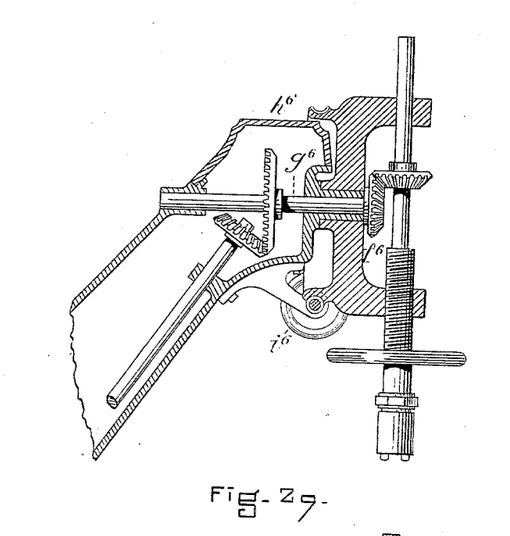
Figure 30:
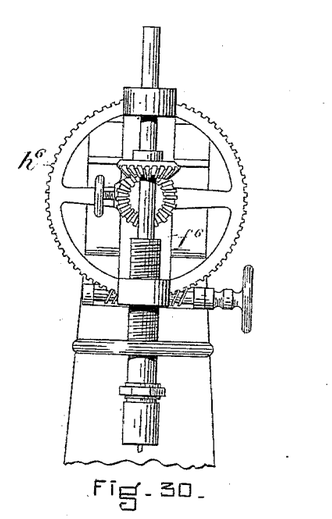

Figs. 29 and 30 show the cutter-spindle mounted in a frame, $f^6$, which is adapted to oscillate on an intermediate shaft, $g^6$, so as to oscillate the cutter and cause it to dress a concave surface. The frame $f^6$ may be provided with a worm-wheel, $h^6$, with which a worm, $i^6$, engages. By rotating said worm the operator is enabled to give the spindle any desired inclination. The cutter may thus be caused to form a dished or concave circular surface by rotating the stone from time to time while it is being acted on by the oscillating cutter.

Figure 31:
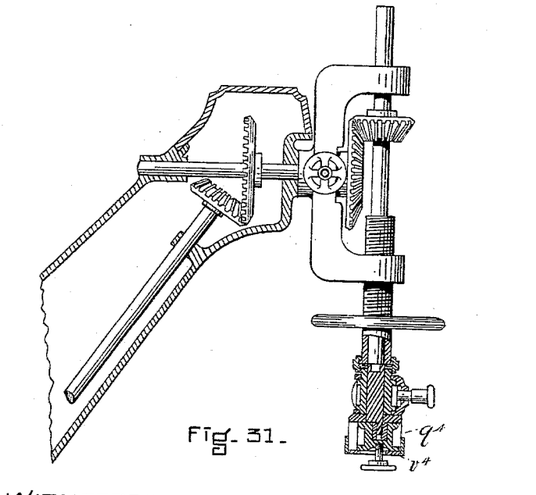
Figure 32:
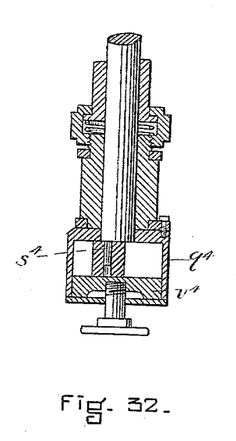

Figs. 31 and 32 show a reciprocating rubbing-tool operated by the rotation of the spindle, the sleeve of the spindle being provided with a casing, $q^4$, in which is a reciprocating slide, $r^4$, engaged with an eccentric pin, $s^4$, on the end of the spindle, and reciprocated thereby. The casing $q^4$ is journaled on the sleeve and is capable of being partially rotated thereon, so that the direction of the movement of the rubbing-tool may be changed from time to time, thus enabling the tool to rub in a direction at any desired angle to the direction in which it may have previously rubbed the same surface. A high polish may thus be imparted, a suitable rubbing or polishing tool being provided.

It will be seen that in this machine all the parts necessary to impart the various movements to the bed or support are driven from a single source of power, thereby distinguishing it from the various kinds of forming-machines where the support or holder is partly driven and partly adjusted by hand.

I do not herein claim the cutter-head shown and described, as that will be embraced in a separate application for patent.

I claim—

1. In a stone-dressing-machine, the combination, with a work-supporting carriage, of traveling supports for the carriage, a main driving-shaft, and mechanism, substantially as described, connecting the supports and the carriage with the shaft, the arrangement being such that the work-supporting carriage may be caused to travel in any substantially horizontal direction, as set forth.

2. In a stone-dressing machine, the combination, with a work-supporting carriage, of a rotary and a reciprocating support for the carriage, and mechanism, substantially as described, for connecting said supports and propelling the same from a single shaft, as set forth.

3. In a stone-dressing machine, the combination of a primary carriage traveling on fixed tracks, a support rotating on a pivot or center carried by said primary carriage, and a secondary work-supporting carriage traveling on said rotary support, and mechanism, substantially as described, for propelling said supports and carriage from a single shaft.

4. In a stone-dressing machine, the combination of the primary carriage adapted to travel on fixed tracks B, having rollers bearing on said tracks, and provided with lateral extensions or supports L L, the rotary support adapted to rotate on a pivot supported by the primary carriage and to bear upon the support L, and the secondary work-supporting carriage adapted to move endwise on tracks on the rotary support, and mechanism for propelling the same from a single source of power, as set forth.

5. In a stone-dressing machine, the combination of the fixed supporting frame or base having a propelling screw-shaft, mechanism for rotating said shaft in either direction, a primary carriage adapted to travel on said fixed support, a rotary support adapted to rotate on the primary carriage, a secondary carriage adapted to travel on the rotary support, and intermediate mechanism, substantially as described, connecting said primary carriage, rotary support, and secondary carriage to the shaft, whereby they may be independently connected with and disconnected from said screw-shaft, as set forth.

6. In a stone-dressing machine, the combination of the fixed supporting frame or base having a screw-shaft, mechanism for rotating said shaft in either direction, a primary carriage adapted to travel on said fixed support, a rotary support adapted to rotate on the primary carriage, a secondary carriage adapted to travel on the rotary support, intermediate mechanism, substantially as described, connecting said primary carriage, rotary support, and secondary carriage to the shaft, whereby they may be independently connected with and disconnected from the screw-shaft, and locking devices whereby said connecting and disconnecting devices are locked in either of the conditions in which they may be placed, and thus prevented from accidental movement, as set forth.

7. In a stone-dressing machine, the combination of the fixed supporting frame or base having a screw-shaft, mechanism for rotating said shaft in either direction, a primary carriage adapted to travel on said fixed support, a rotary support adapted to rotate on the primary carriage, a secondary carriage adapted to travel on the rotary support, mechanism, substantially as described, connecting said primary carriage, rotary support, and secondary carriage to the shaft, whereby they may be independently connected with and disconnected from the screw-shaft, and locking devices whereby the primary and secondary carriages may be prevented from independent motion when disconnected from the screw-shaft, as set forth.

8. In a stone-dressing machine, the combination of the fixed supporting frame or base having flanges or tracks, a screw-shaft, operating mechanism for said shaft, the primary carriage adapted to travel on the tracks and having a movable half-nut adapted to engage with the screw-shaft, a locking device adapted to prevent the movement of the carriage on its tracks, and mechanism connected therewith whereby the half-nut may be disengaged from or engaged with the screw-shaft, and the locking device simultaneously made operative or inoperative, as set forth.

9. In a stone-dressing machine, the combination of the fixed supporting frame or base having a screw-shaft, operating mechanism for said shaft, the primary carriage adapted to travel on said base, and provided with mechanism, substantially as described, connected therewith, whereby it may be engaged with or disengaged from the screw-shaft, the rotary support journaled on an arbor or pivot supported by the primary carriage, and supported by said carriage, the worm 1, engaged with the worm-wheel 2, forming a part of the rotary support, and intermediate mechanism, substantially as described, connecting said parts, whereby said worm may be connected with and disconnected from the screw-shaft, as set forth.

10. In a stone-dressing machine, the combination of the fixed supporting frame or base having a screw-shaft, operating mechanism for said shaft, the primary carriage adapted to travel on said base, and provided with mechanism, substantially as described, whereby it may be engaged with or disengaged from the screw-shaft, the arbor E, journaled in the primary carriage and provided with the worm-wheel N and pinion P, mechanism, substantially as described, whereby said worm-wheel and arbor may be rotated by the screw-shaft, the rotary support journaled on the arbor, mechanism, substantially as described, whereby said support may be rotated in either direction by the screw-shaft, and the secondary carriage D, adapted to travel on and rotate with the rotary support, and provided with a rack, R, meshing with the pinion P on the arbor E, as set forth.

11. In a stone-dressing machine, the combination of the fixed base or support having the screw-shaft, operating mechanism for said shaft, the primary carriage adapted to travel on said base, and the secondary carriage supported by the primary carriage and adapted to move independently thereof, as described, and mechanism connecting the same whereby either carriage may be put in operative connection with the screw-shaft, the other being at the same time disconnected from the said shaft and made inoperative, as set forth.

12. The combination of the screw-shaft S, primary carriage D, nut T, engaging with the shaft, lever $q$, connected to the nut and engaging with rack $s$, and shaft $v$, carrying pinion $u$, also engaging with the rack, as set forth.

13. The combination of the screw-shaft S, primary carriage D, half-nut T, engaging with the shaft, lever $q$, connected with the nut and engaging rack $s$, shaft $v$, carrying pinion $u$, also engaging with the rack $s$, and cam $i'$ on shaft $v$, operating clamp $f'$, as set forth.

14. The combination of the screw-shaft S, primary carriage D, sliding half-nut T, engaging with the shaft, lever $q$, connected with the nut and engaging rack $s$, shaft $v$, carrying pinion $u$, also engaging rack $s$, arbor E, having worm-wheel N and pinion P, attached thereto, swinging frame $j'$, connected with the half-nut by link $l'$, the worm O, journaled in the frame $j'$, and engaging with a gear-wheel on the screw-shaft, and the secondary carriage having a rack engaging with the pinion on the arbor E, as set forth.

15. The combination, with a reciprocating carriage for carrying a stone to be dressed, of the arbor E, having the flanged worm-wheel N, the brake $o'$, embracing the flange of the worm-wheel, the swinging frame $j'$, having the worm O, and the dog $s'$, having an arm engaging with the frame $j'$, and adapted to compress the brake, as set forth.

16. In a stone-dressing machine, the combination, with a horizontally-adjustable rotary carriage, of an overhanging rotary cutter adapted to form a molded edge upon a slab of stone placed upon the rotating carriage, and connections, substantially as described, whereby both are driven from the same shaft, as set forth.

17. The combination of the cutter-spindle, the sleeve carrying said spindle having an arm, $j^4$, and the turret $g^4$, journaled on said arm and adapted to hold a series of cutters and present either of them to the spindle, as set forth.

18. The combination, with a work-supporting carriage having slots, of a clamp composed of a slotted plate having bolts for engagement with the slots in the carriage, a jaw connected with the clamp, and a stop adapted to bear against the edge of a slab on the carriage, as set forth.

In testimony whereof I have signed my name to this specification, in the presence of two subscribing witnesses, this 4th day of January, 1884.

JAMES W. MALOY.

Witnesses:
C. F. BROWN,
A. L. WHITE.